United States Patent
Schlatzer et al.

(10) Patent No.: US 10,247,259 B2
(45) Date of Patent: Apr. 2, 2019

(54) DEVICE FOR ACTUATING A CLUTCH-CONTROLLED TRANSFER CASE HAVING A TWO-STAGE INTERMEDIATE GEARING AND CLUTCH-CONTROLLED TRANSFER CASE THAT HAS A TWO-STAGE INTERMEDIATE GEARING AND THAT IS EQUIPPED WITH SAID DEVICE

(71) Applicant: Magna Powertrain GmbH & Co KG, Lannach (AT)

(72) Inventors: Helmut Schlatzer, Kainach (AT); Martin Stocker, Feldkirchen bei Graz (AT); Ferdinand Tangl, Hart bei Graz (AT)

(73) Assignee: MAGNA POWERTRAIN GMBH & CO KG, Lannach (AT)

( * ) Notice: Subject to any disclaimer, the term of this patent is extended or adjusted under 35 U.S.C. 154(b) by 0 days.

(21) Appl. No.: 15/310,129

(22) PCT Filed: Apr. 23, 2015

(86) PCT No.: PCT/EP2015/058848
§ 371 (c)(1),
(2) Date: Nov. 10, 2016

(87) PCT Pub. No.: WO2015/176912
PCT Pub. Date: Nov. 26, 2015

(65) Prior Publication Data
US 2017/0167548 A1    Jun. 15, 2017

(30) Foreign Application Priority Data

May 21, 2014    (DE) .................... 10 2014 209 701

(51) Int. Cl.
*F16D 23/12*    (2006.01)
*F16H 61/28*    (2006.01)
(Continued)

(52) U.S. Cl.
CPC ............ *F16D 23/12* (2013.01); *B60K 17/344* (2013.01); *F16D 13/52* (2013.01);
(Continued)

(58) Field of Classification Search
CPC .... F16D 23/12; F16D 2023/123; F16D 13/52; F16D 2023/126; B60K 17/344; F16H 2061/2869; F16H 61/32; F16H 63/04
See application file for complete search history.

(56) References Cited

U.S. PATENT DOCUMENTS 7,540,820 B2 *    6/2009    Mizon ................ B60K 17/3467
                                                          180/249
8,091,451 B2 *    1/2012    Wolfsjager ........... B60K 17/344
                                                          180/247
(Continued)

FOREIGN PATENT DOCUMENTS

DE        3037990 A1     5/1982
DE       19947763 C1     6/2001
(Continued)

OTHER PUBLICATIONS

International Search Report and Written Opinion dated Jul. 2, 2015 from International Patent Application No. PCT/EP2015/058848 (with English translation of International Search Report).

*Primary Examiner* — Jacob S. Scott
*Assistant Examiner* — Tinh Dang
(74) *Attorney, Agent, or Firm* — Dickinson Wright PLLC

(57) ABSTRACT

A device for actuating a clutch-controlled transfer case including a rotatable selector shaft, a clutch cam disk rotatable about a clutch cam disk axis by means of the selector shaft and having a gate, and at least one scissor lever having an end guided in the gate. The gate has at least one curved portion having a continuously increasing radial distance from the clutch cam disk axis. The clutch cam disk defines an opening about the clutch cam disc axis, and the (Continued)

clutch cam disk defines a pair of stops extending radially into the opening. The selector shaft is rotatably positioned in the opening. The selector shaft includes a stopping member in radial alignment with the pair of stops such that the selector shaft can be rotated with respect to the clutch cam disk between two stops.

14 Claims, 6 Drawing Sheets

(51) Int. Cl.
 *F16H 61/32* (2006.01)
 *F16H 63/04* (2006.01)
 *B60K 17/344* (2006.01)
 *F16D 13/52* (2006.01)
(52) U.S. Cl.
 CPC .. *F16D 2023/123* (2013.01); *F16D 2023/126* (2013.01); *F16H 61/32* (2013.01); *F16H 63/04* (2013.01); *F16H 2061/2869* (2013.01)

(56) References Cited

U.S. PATENT DOCUMENTS

| | | | | |
|---|---|---|---|---|
| 8,256,559 | B2* | 9/2012 | Kato | B60K 23/08 180/245 |
| 8,459,149 | B2* | 6/2013 | Suzuki | B60K 17/35 74/665 G |
| 2010/0107811 | A1* | 5/2010 | McCloy | B60K 17/3467 74/665 F |
| 2012/0291580 | A1* | 11/2012 | Kim | F16D 23/12 74/473.12 |
| 2016/0290500 | A1* | 10/2016 | Ono | F16H 61/32 |

FOREIGN PATENT DOCUMENTS

| | | |
|---|---|---|
| DE | 112006002138 T5 | 7/2008 |
| DE | 102012003482 A1 | 8/2013 |
| EP | 1875109 B1 | 10/2010 |
| EP | 1977128 B1 | 12/2012 |
| WO | WO2006128533 A1 | 12/2006 |
| WO | WO2008115370 A1 | 9/2008 |

* cited by examiner

DEVICE FOR ACTUATING A CLUTCH-CONTROLLED TRANSFER CASE HAVING A TWO-STAGE INTERMEDIATE GEARING AND CLUTCH-CONTROLLED TRANSFER CASE THAT HAS A TWO-STAGE INTERMEDIATE GEARING AND THAT IS EQUIPPED WITH SAID DEVICE

CROSS-REFERENCE TO RELATED APPLICATIONS

This application is a U.S. National Stage of International Application No. PCT/EP2015/058848, filed Apr. 23, 2015 and which claims priority to German Application No. 10 2014 209 701.0 filed May 21, 2014. The entire disclosure of each of the above listed applications is incorporated herein by reference.

FIELD

The present invention relates to a device according to the preamble of independent claim 1 and to a clutch-controlled transfer case according to the preamble of claim 14.

BACKGROUND

A transfer case is often used in motor vehicles having all-wheel drive in order to distribute a torque, which is generated by the engine and is made available at a drive shaft of the transfer case, to two output shafts of the transfer case and, therefore, to more than one driven axle. Each of the output shafts, in this case, drives one axle of the motor vehicle or—if the motor vehicle has more than two driven axles—one axle drive with drive-through.

Along the power flow from the engine to the driven axle, the transfer case is usually installed downstream of the vehicle transmission transmitting the torque generated by the engine.

For example, for use in off-road vehicles and/or in heavy tractors, it is possible to provide, in addition to a multi-wheel drive and/or an all-wheel drive implemented by means of a transfer case, a two-stage transfer case, which is also referred to as an off-road reduction, having a first stage for road use and a second stage for off-road and/or heavy tractive use.

Such a two-stage intermediate gearing can be implemented, e.g., in the form of a planetary gear set, in which one or multiple stages can be locked relative to one another and/or relative to a stationary housing and/or relative to a shaft, for example by means of at least one claw clutch, whereby the transmission ratio changes.

Transfer cases with and without an intermediate gearing are classified as so-called differential-controlled transfer cases and clutch-controlled transfer cases, depending on their design as a permanent all-wheel drive or as an all-wheel drive which can be engaged and disengaged, e.g., automatically or manually by the driver of a motor vehicle.

In differential-controlled transfer cases, a differential gear, which can be locked manually, as necessary, or automatically, and/or a planetary gear distributes the power flow to two output shafts which are permanently coupled to the drive shaft.

In clutch-controlled transfer cases, an automatically and/or manually actuated clutch, in particular a friction clutch, such as, e.g., a lamellar clutch, or a viscous clutch with rotational-speed equalization or a rigid clutch without rotational-speed equalization, such as, e.g., a claw clutch, distributes the power flow to two driven shafts, one of which, i.e., the so-called primary shaft, is permanently coupled to the drive shaft, and the other of which, i.e., the so-called secondary shaft, is coupled to the drive shaft only as necessary and, otherwise, is decoupled from the drive shaft.

Transfer cases for an engageable and disengageable all-wheel drive are also known; although these transfer cases are not permanent, they comprise a differential and/or a planetary gear, which take or takes over the task of distributing the drive power when the all-wheel drive is engaged. In this hybrid form, the all-wheel drive is differential-controlled, although it can be disengaged and engaged by using one or multiple clutches. Since these transfer cases also comprise a clutch which can be engaged and disengaged via a secondary shaft, they are also considered to be clutch-controlled transfer cases.

For the sake of completeness, it should be noted that transfer cases are also known which operate without a clutch at all and without a differential or planetary gear, for example when the wheels have free-wheeling hubs on the driven axles.

Due to their simple and robust design, most clutch-controlled transfer cases have a friction clutch.

A friction clutch is a power-shiftable machine element for transferring torque between a driven shaft and a shaft to be driven.

A first typical embodiment of a friction clutch is a single-disk friction clutch, or a single-disk clutch. This comprises a first friction disk, which is also referred to as a clutch disk and which is non-rotatably connected to one of the two shafts, e.g., to the driven shaft, and a second friction disk, which is non-rotatably connected to the remaining shaft, e.g., to the shaft to be driven. The first friction disk, which forms the clutch disk, is disposed in such a way that the friction disk can be displaced with respect to the second friction disk along the common longitudinal axis of the two shafts.

If the friction disks of the driven shaft and the shaft to be driven are pressed together axially, a force-locked connection occurs and, therefore, torque is transferred and, when the driven shaft rotates, mechanical power is transferred.

A second typical embodiment of a friction clutch is a friction-lamellar clutch, or lamellar clutch.

Its characteristic feature, as compared to other friction clutches, such as, e.g., the previously described single-disk clutch, is the arrangement of multiple friction disks in a row, which friction disks are also referred to in that case as friction linings. In this case, a first friction disk, as viewed along the row, is non-rotatably connected to the driven shaft, a second friction disk is connected to the shaft to be driven, a third friction disk is also connected to the driven shaft, and so forth, in alternation. A friction disk which is non-rotatably connected to the driven shaft, and a friction disk which is non-rotatably connected to the shaft to be driven, form a friction pair. If the friction disks of the driven shaft and of the shaft to be driven are pressed together axially with a specified pressure force, the same pressure force acts on all friction pairs. Due to the larger contact area between the friction disks which are non-rotatably connected to the driven shaft and the friction disks which are non-rotatably connected to the shaft to be driven, higher torques can be transferred with the lamellar clutch as compared to, e.g., a single-disk clutch, given an identical pressure force.

Friction clutches in the form of lamellar clutches are used for torque transmission in conventional all-wheel drive trains. These clutches must be pressed together with a force of multiple kN, in order to transfer the required torques.

Friction clutches, such as, e.g., lamellar clutches, are mostly actuated electro-hydraulically, e.g., by means of an electric motor-driven hydraulic pump and a hydraulic piston, or electro-mechanically, e.g., by means of an electric motor via a spur-gear transmission and/or a worm gear and/or a ball ramp mechanism and/or a toggle lever mechanism and/or a combination thereof.

On the basis of the aforementioned, non-conclusive list, it is apparent that there is a multiplicity of different design possibilities for actuating a friction clutch.

Due to the usually highly limited installation space in clutch-controlled transfer cases having a two-stage intermediate gearing, some of the aforementioned actuating mechanisms are dispensed with at the start. In addition, due to the usually highly limited installation space and the high cost pressure, an installation of two actuating mechanisms, one of which actuates the clutch and the other of which shifts the intermediate gearing, is dispensed with, in principle.

In order to actuate a clutch-controlled transfer case having a two-stage intermediate gearing, it is therefore known to provide a device which both actuates the clutch and shifts the intermediate gearing.

A common solution of a device for actuating the clutch and for shifting the intermediate gearing comprises a relatively small 12 V electric motor in a power class of less than 100 W and having a torque of less than 1 Nm.

In light of these basic conditions, a correspondingly high mechanical transmission ratio between the electric motor and the clutch is required.

This transmission ratio must be reasonably priced, must have good efficiency, and must fit within a usually highly limited installation space.

A conventional embodiment of transfer cases having a two-stage intermediate gearing must both actuate the clutch and shift the two-stage intermediate gearing by means of a device having an electric motor-driven selector shaft having two cam disks.

In this case, in a first angle-of-rotation range of the selector shaft, the clutch is actuated in the first shifting stage of the intermediate gearing; in a second angle-of-rotation range of the selector shaft, shifting back and forth between the first and the second shifting stage occurs; and, in a third angle-of-rotation range of the selector shaft, the clutch is actuated in the second shifting stage of the intermediate gearing.

The entire angle range available therefor, which is 360°, is limited to one full revolution of the selector shaft. Therefore, the transmission ratio for actuating the clutch is also limited.

A clutch-controlled transfer case having a two-stage intermediate gearing and a clutch designed as a lamellar clutch is known from DE 11 2006 002 138 T5. For the purpose of actuating the clutch and shifting the intermediate gearing, the transfer case comprises a device having a selector shaft and an electric motor, which sets the selector shaft into rotation, and two cam disks, one clutch cam disk, and one selector cam disk. The selector cam disk is disposed on the selector shaft. A rotation of the selector cam disk starting from a neutral position by, at most, one half of a revolution in both directions of rotation results in an axial motion which, depending on the direction of rotation of the selector shaft, effectuates a shifting of the intermediate gearing from the first stage into the second stage and vice versa. The clutch cam disk is connected to a ball ramp mechanism, which acts parallel to the longitudinal axis of the selector shaft and acts axially on the lamellar clutch. The ball ramp mechanism presses the lamellar clutch together when the clutch cam disk is rotated, starting from a neutral position, both in a first direction of rotation and in an opposite, second direction of rotation. The clutch cam disk is rotatably driven by means of the selector shaft. For this purpose, a disk cam having two entraining elements, which are spaced apart from one another by a neutral angle of rotation, is disposed on the selector shaft and engages with the clutch cam disk when the selector shaft is rotated both in a first direction of rotation and in an opposite, second angle of rotation, starting from a neutral position. The neutral angle of rotation in this case is dimensioned in such a way that, starting from a neutral position of the selector shaft, one of the two entraining elements, depending on the direction of rotation, finally entrains the clutch cam disk when half the neutral angle of rotation has been exceeded and, therefore, swivels the clutch cam disk in the direction opposite to the selector shaft. As a result, shifting back and forth between the shifting stages of the intermediate gearing can occur, by means of the selector cam disk, within the angle-of-rotation range given by the neutral angle of rotation, whereupon the lamellar clutch is pressed together only when the clutch cam disk is entrained by one of the two entraining elements. The clutch cam disk experiences a rotation by only approximately 45° in each direction, in this case, given an angle-of-rotation range of the selector shaft, starting from its neutral position, which is limited, overall, to one full revolution, as described above in the description of the selector cam disk. As a result, said clutch cam disk experiences a maximum angle-of-rotation range of one-fourth of a revolution as compared to one full revolution of the selector shaft. As a result, the entire transmission ratio of the ball ramp mechanism disadvantageously tends toward one-fourth of one revolution, both in one direction of rotation and in the other direction of rotation. Alternatively, the ball ramp mechanism can be directly coupled to the selector shaft via a gear set. The clutch cam disk and the disk cam are dispensed with in this case. For the same mode of operation, the ball ramp mechanism requires a neutral range, however, within which the switching process can take place.

It is known from EP 1 977 128 B1, with respect to a clutch-controlled transfer case having a two-stage intermediate gearing and a clutch designed as a lamellar clutch, to design the clutch cam disk of a device for actuating the clutch and for shifting the intermediate gearing so as to have a selector shaft and an electric motor, which sets the selector shaft into rotation, and two cam disks, one selector cam disk, and one clutch cam disk, having two helical channels, each of which spirals once around the clutch cam disk axis, in and along each of which one of two rollers roll, which rollers are disposed diametrically opposite one another with respect to the clutch cam disk axis. Each helical channel has a central depression in its center, starting from which a ramp, which rises in the axial direction, extends toward each of the opposite ends of each helical channel, in both directions of rotation. As viewed from a center point of the clutch cam disk, which is situated on the clutch cam disk axis, the two depressions of the two helical channels are disposed diametrically opposite one another. The rollers are rotatable about radially extending axes and are disposed so as to be radially displaceably supported in a gear, which meshes with a spur gear and is rotatable via the spur gear by means of the selector shaft. The clutch disk itself is disposed between two stops, which define a neutral range, so as to be rotatable by approximately 180°. In the neutral position of the selector shaft, the clutch disk is situated in an angle-of-rotation position between the two stops. The selector cam disk is non-rotatably connected to the selector shaft. The selector cam disk has an axial gate guide. The gate guide has a ramp around the neutral position, which ramp rises in the axial direction along the selector shaft and, at each of its two ends, transitions into a slot, which encircles the selector shaft, in a plane which is normal to the axis of the selector shaft. A selector pin, which is guided by means of the gate guide in both axial directions along the selector shaft, engages into the gate guide. A movement of the selector pin parallel to the axis of the selector shaft effectuates a change in the shifting stages of the intermediate gearing. If the selector shaft rotates, starting from the neutral position, in one direction of rotation, the selector shaft drives the gear, via the spur gear, using both rollers. When the selector shaft is rotated, starting from the neutral position, in one direction of rotation, the two rollers of the gear coupled to the selector shaft—which rollers are situated, in the neutral position, between the oppositely rising ramps of the helical channel, in the depressions assigned to the rollers—rotate the clutch cam disk out of the neutral position and against one of the two stops, depending on the direction of rotation. In order to rotate the clutch cam disk from stop to stop, the selector shaft rotates through one angle-of-rotation range referred to as a neutral range, within which shifting back and forth between the first and the second shifting stage of the intermediate gearing can occur without actuating the clutch. The shifting back and forth between the first and the second shifting stage of the intermediate gearing takes place by way of the selector shaft simultaneously rotating the selector cam disk during the rotation of the clutch cam disk out of the neutral position and against one of the stops, in the gate guide of which selector cam disk the selector pin initially follows the ramp and thereby experiences an axial displacement. Rotating the selector shaft in the opposite direction effectuates a switch between the shifting stages of the intermediate gearing. If the selector shaft continues to rotate in a direction of rotation that has been selected, the ramp of the gate guide of the selector cam disk transitions at the end of the neutral range into the slot, and therefore the selector pin does not experience any further axial displacement and the selected shifting stage of the intermediate gearing is retained. The two rollers of the gear, which also continues to rotate as the selector shaft continues to rotate, however, follow the ramps, which rise in the axial direction starting from the two central depressions, in the two helical channels, each of which is associated with one of the two rollers, of the clutch cam disk, which is now resting against a stop. The rollers are part of a ball ramp mechanism, which presses the lamellar clutch together with force which increases, the further the rollers follow the ramps upward in the helical channels associated with the rollers. Due to the radial displaceability of the rollers, a rotation of the gear with respect to the clutch cam disk, which is resting against a stop, by one full revolution is made possible. As a result, the transmission ratio necessary for pressing the lamellar clutch together is advantageously distributed across one full revolution in each direction. In addition, the neutral range, within which a switch between the shifting stages of the intermediate gearing takes place, can be defined by a suitable position of the stops. As a result, the transmission for switching the shifting stages can also be distributed across the neutral range defined by the stops.

It is known from EP 1 875 109 B1, with respect to a clutch-controlled transfer case having a friction clutch, which is designed as a lamellar clutch, e.g., to obtain a high transmission ratio for the actuation of the friction clutch by pressing the friction clutch together by means of two ramp rings. It is essential that a rotation of the two ramp rings in the opposite direction pushes the ramp rings apart in the axial direction. One scissor lever is mounted on each of the ramp rings or is integral therewith. The ends of the scissor lever provided with rollers ride on the circumference of a clutch cam disk. The circumference of the clutch cam disk is bisected into two curved paths, which are point-symmetrical with respect to the center point of the clutch cam disk, with one curved path for each scissor lever. The curved paths are designed in such a way that the scissor levers swivel in opposite directions with increasing rotation of the clutch cam disk starting from a starting position. As a result, the transmission ratio necessary for pressing the lamellar clutch together can be distributed across one half of one revolution of the clutch cam disk in one direction of rotation.

A feature shared by the clutch-controlled transfer cases having a two-stage intermediate gearing known from the prior art is a limited transmission ratio for pressing their friction clutches together.

SUMMARY

The problem addressed by the invention is that of developing a device for actuating a clutch-controlled transfer case having a two-stage intermediate gearing, which device has a higher transmission ratio, and of developing a clutch-controlled transfer case having a two-stage intermediate gearing equipped with such a device.

The problem is solved by the features of the independent claims.

One first object of the invention therefore relates to a device for actuating a clutch-controlled transfer case having a two-stage intermediate gearing. The device comprises:
  a selector shaft, which is preferably driven so as to be rotatable in opposite directions of rotation,
  a drive, preferably an electric motor, wherein other drives, such as, e.g., hydraulic or pneumatic drives, to name only a few conceivable embodiments, or combinations thereof, are conceivable for rotating the selector shaft,
  a clutch cam disk and, preferably, a selector cam disk, both of which can be rotated, by means of the selector shaft, about a separate axis or about a shared axis which is identical, e.g., to the axis of the selector shaft, or one of which can be rotated about the axis of the selector shaft and the other can be rotated about a separate axis, and
  one or two scissor levers, which are coupled to an actuating mechanism for actuating a friction clutch which establishes, as necessary, a variable power flow between the drive shaft of the transfer case and the secondary shaft of the transfer case.

By means of the device, in a first angle-of-rotation range, the clutch is actuated in the first shifting stage of the intermediate gearing; in a second angle-of-rotation range, shifting back and forth between the first and the second shifting stage occurs; and, in a third angle-of-rotation range, the clutch is actuated in the second shifting stage of the intermediate gearing.

One end of at least one scissor lever, which is preferably provided with at least one roller, is guided in a gate provided on the clutch cam disk.

The gate can have a curved path for each guiding end of a scissor lever.

For example, a first curved path associated with a first scissor lever can be provided on a first end face of the clutch cam disk, and a second curved path associated with a second scissor lever can be provided on a second end face of the clutch cam disk, which is opposite the first end face of the clutch cam disk. The clutch cam disk axis is normal to both end faces in this case.

Alternatively, a first curved path associated with a first scissor lever and a second curved path associated with a second scissor lever to be provided on the same end face of the clutch cam disk, wherein the curved paths are designed so as to be nested into each other, spiraling around the clutch cam disk axis, which is normal to the end face of the clutch cam disk.

The curved path can be designed in such a way that, when the clutch cam disk is rotated, starting from a neutral position, with an increasing angle of rotation both in one direction of rotation and in the opposite direction of rotation, the scissor lever, which is guided via its end in the curved path, experiences an increasing deflection away from the clutch cam disk axis in one direction of rotation, starting from a starting position, and experiences an increasing deflection toward the clutch cam disk axis in the other, opposite direction of rotation, starting from a starting position.

As a result, starting from the neutral position, a first angle-of-rotation range is formed in one direction of rotation, in which the clutch is actuated in the first shifting stage of the intermediate gearing and, in the other direction of rotation, a third angle-of-rotation range is formed, in which the clutch is actuated in the second shifting stage of the intermediate gearing. This configuration can be used both with one scissor lever and with two scissor levers.

Alternatively, in the case of two scissor levers, the curved path of one scissor lever can be designed in such a way that, when the clutch cam disk is rotated, starting from a neutral position, the scissor lever, which is guided via its end in the curved path and assumes a starting position in the neutral position, experiences an increasing deflection away from the clutch cam disk axis or experiences an increasing deflection toward the clutch cam disk axis as the angle of rotation increases in the particular direction of rotation and, in the other, opposite direction of rotation, is guided at a constant distance from the clutch cam disk axis, whereas the curved path of the other scissor lever is designed in such a way that, when the clutch cam disk is rotated, starting from a neutral position, the other scissor lever, which is guided via its end in the curved path and assumes a starting position in the neutral position, maintains a constant distance from the clutch cam disk axis as the angle of rotation increases in one direction of rotation and, in the other, opposite direction of rotation, experiences an increasing deflection away from the clutch cam disk axis or an increasing deflection toward the clutch cam disk axis.

As a result, in each direction of rotation, only one of the two scissor levers is deflected, whereas the remaining scissor lever maintains its starting position, and, starting from the neutral position, one scissor lever experiences a deflection in one direction of rotation and the other scissor lever experiences a deflection in the opposite direction of rotation.

If two scissor levers are provided, which are each guided via their ends in a curved path of the gate, the two curved paths, each of which is associated with one end of the scissor lever, are designed in such a way that the scissor levers swivel in opposite directions in both directions of rotation.

For example, this can be implemented by way of the two scissor levers engaging via their ends, diametrically opposed to the clutch cam disk axis, opposite one another into curved paths, which are identically designed, but are swiveled with respect to one another by 180° about the clutch cam disk axis and wind around the clutch cam disk axis, and/or are guided via their ends in corresponding curved paths.

In each direction of rotation, a curved path, starting from a neutral position, which is situated, e.g., approximately in the middle of the curved path, winds by at least 180° around the clutch cam disk axis, and therefore more than one complete revolution of the clutch cam disk is required for one end of a scissor lever, which is guided in a curved path, to move from one end of a curved path, e.g., via the neutral position, to the opposite end of the curved path.

As a result, an angular deflection of more than 360° can be achieved, accompanied by a transmission ratio which is increased by at least approximately 25% as compared to a limited angular deflection of less than 360°.

In principle, an embodiment having only one scissor lever, which is guided via its end provided, e.g., with a roller, in a gate of the clutch cam disk, is conceivable, or an embodiment having a first scissor lever, which is guided via its end provided, e.g., with a roller, in a gate of the clutch cam disk, and a second second scissor lever which is supported, e.g., against a housing or against the selector shaft, is conceivable.

Alternatively, an embodiment having two scissor levers, each of which is guided via their ends in a curved path of the gate, is conceivable.

The actuating mechanism, which is coupled to the scissor lever or scissor levers, can comprise two ramp rings, which can be rotated opposite one another and which can either both be rotated opposite one another, or one is designed so as to be stationary and the other is designed so as to be rotatable with respect to the stationary ramp ring, wherein at least one ramp ring is connected to a scissor lever or is integral therewith. It is essential that a rotation of the two ramp rings in the opposite direction pushes the ramp rings apart in the axial direction.

If only one scissor lever is provided, which is guided via its end, e.g., provided with a roller, in the gate of the clutch cam disk, the swiveling thereof with respect to the remaining, non-rotatable ramp ring, which is supported against the selector shaft in a non-rotatable manner, e.g., by means of a second scissor lever, likewise causes the two ramp rings to be pushed apart in the axial direction.

In order to allow the two ramp rings to be pushed apart both in one direction of rotation and in the other, opposite direction of rotation, starting from a neutral position, both ramp rings can be provided, on one of their end faces in each case, with at least one circumferential, V-shaped ramp which has a depression in its middle and the ends of which impact one another at a raised point, either constantly in the mathematical sense, i.e., without an interposed jump, or constantly impact one another via one end of an adjacent, identical ramp at a raised point, wherein a W-shaped structure, as viewed around the circumference of the ramp rings, results in the case of, e.g., two V-shaped ramps starting and ending at the same raised point. The two ramp rings face one another via their end faces provided with ramps, wherein, in the neutral position, a raised point of one ramp ring comes to rest in a depression of the other ramp ring.

The ramp rings can be designed as ball ramp rings or, together, can form a ball ramp mechanism.

The clutch cam disk is disposed so as to be rotatable, with respect to the selector shaft, between two stops through a second angle-of-rotation range forming a neutral range, within which shifting back and forth between the first and the second shifting stage can occur.

For this purpose, the selector cam disk is operatively connected to the intermediate gearing in such a way that, starting from the neutral position, when the selector shaft is rotated in opposite directions of rotation within the neutral range, a switch between the shifting stages of the intermediate gearing occurs, wherein, once the neutral range has been exited, the shifting stage of the intermediate gearing, which has been selected by means of a direction of rotation starting from the neutral position, is maintained, and the friction clutch is pressed together with increasing force as the angle of rotation increases due to a resultant entraining of the clutch cam disk as the rotation of the selector shaft continues at the end or outside of the neutral range due to a deflection of the at least one scissor lever, the friction coupling establishing a variable power flow between the drive shaft of the transfer case and the secondary shaft of the transfer case.

Whereas shifting back and forth between the first and the second shifting stage of the intermediate gearing occurs within the second angle-of-rotation range forming the neutral range, the clutch cam disk is held still in a neutral position by the at least one scissor lever guided via its end in the gate.

Once the selector shaft has been rotated past the second angle-of-rotation range, the clutch cam disk begins to rotate as well, via a stop. Therefore, an angle-of-rotation range of at least approximately 180° is available, in each of the two directions of rotation, only for the actuation of the friction clutch.

The at least one curved path of the gate provided on the clutch cam disk can have a degressive configuration with regard to she deflection of the at least one scissor lever, which is guided via its end in the curved path, which deflection increases as the angle of rotation increases, both in one direction of rotation and in the other, opposite direction of rotation. For example, the degressive configuration can be designed in such a way that the curved path has different slopes away from or toward the clutch cam disk axis in the area of the air gap of the friction clutch and in the area of the clutch actuation, in which the friction clutch is pressed together at the end of the air gap. Preferably, starting from the neutral position, a high slope is initially provided in the area of the air gap, whereas, adjacent thereto, a flat slope is provided in the area of the clutch actuation.

As a result, the transmission ratio can be increased in the area of the clutch actuation by approximately 20% as compared to a linear design.

The clutch travel, through which the friction clutch must be pressed together in order to be actuated, is essentially subdivided into three ranges: an air gap, tolerances and wear, and actuating travel. The necessary forces are very low in the air gap. Therefore, this area can be passed through with a high slope, accompanied by a low transmission ratio of the at least one curved path of the gate. Due to the high slope, only a small angle of rotation of the selector shaft is required for a specified air gap of the friction clutch, whereby a greater part of the first and the third angle-of-rotation range, which is available for pressing the friction clutch together and within which the friction clutch is actuated, remains. In this remaining part, the at least one curved path of the gate has a low slope in the direction of rotation toward the clutch cam disk axis and in the other, opposite direction of rotation away from the clutch cam disk axis, corresponding to a high transmission ratio.

The degressive configuration of the at least one curved path of the gate, which effectuates changes in the deflection of the scissor lever of different extents given a constant change in the angle of rotation, can be designed either on the basis of a mathematical function which is constant in the mathematical sense, or so as to have two or more slopes which are different, but each of which is constant.

The clutch cam disk is preferably disposed on the selector shaft so as to be rotatable through the second angle-of-rotation range, which forms a neutral range.

It is important to emphasize that, in conventional devices for actuating a clutch-controlled transfer case having a two-stage intermediate gearing by means of the clutch cam disk, which is also referred to as a control cam, two scissor levers are swiveled in opposition to one another and then exert an axial force on the clutch, e.g., via helical ball ramp mechanisms. One of the two scissor levers can move via its end, e.g., on the circumference of the control cam, whereas the other scissor lever is supported against the selector shaft or against a housing of a clutch-controlled transfer case having a two-stage intermediate gearing, which, inter alia, can accommodate, e.g., at least one part of the device for actuating the clutch-controlled transfer case having a two-stage intermediate gearing. In the device according to the invention, however, a gate provided on the clutch cam disk for guiding one end of at least one scissor lever is provided with a separate helical curved path for each guiding end of a scissor lever, at least for the end of a scissor lever provided, e.g., with at least one roller, and preferably for the ends of both scissor levers provided, e.g., with at least one roller in each case. As a result, in the device according to the invention, an angle-of-rotation range of the clutch cam disk which can exceed 360° is obtained, whereby, as compared to a rotation by less than 360°, a smaller slope of one curved path or both curved paths, as viewed in the radial direction of the clutch cam disk axis, with respect to a specified increment of the angle of rotation is selected and, as a result, a higher transmission ratio can be implemented.

Advantages over the prior art result, in addition to completely solving the stated problem and eliminating all disadvantages of the prior art, inter alia, from an increase in the mechanical transmission ratio or from an increase in the transmission ratio between the drive of the device for actuating a clutch-controlled transfer case having a two-stage intermediate gearing and the actuating mechanism of a transfer case equipped with such a device, which actuating mechanism exerts an axial force on the friction clutch.

Additional advantages result due to an improvement in the overall efficiency within a chain of actuators extending from the drive to the actuating mechanism.

One advantage associated therewith is cost saving due to a reduced power requirement at the drive of the device.

A second object of the invention relates to a clutch-controlled transfer case having a two-stage intermediate gearing. The transfer case comprises:
  a drive shaft,
  a primary shaft, which is permanently coupled to the drive shaft, e.g., being fixedly connected thereto or integral therewith,
  a secondary shaft, which is optionally disposed with axial offset with respect to the drive shaft,
  optionally, a transfer case, which is disposed between the secondary shaft and the drive shaft and bridges their axial offset, which offset may be present,
  a friction clutch, which is disposed between the drive shaft and the secondary shaft, couples these to the drive shaft as necessary for its operation and decouples these from the drive shaft as necessary for its disengagement, the friction clutch having at least one friction pair consisting of a first friction disk, which is non-rotatably connected to a driven shaft, and a second friction disk, which is non-rotatably connected to a shaft to be driven, an actuating mechanism which, when actuated, exerts an axial force on the one friction pair or the multiple friction pairs of the friction clutch, which axial force causes the friction clutch to be pressed together, a two-stage intermediate gearing having a first and a second shifting stage, and an above-described device for actuating a clutch-controlled transfer case having a two-stage intermediate gearing, which actuates the friction clutch and switches the shifting stages of the intermediate gearing.

The actuating mechanism is actuated by means of the at least one scissor lever, which is guided via its ends in the guide of the clutch cam disk.

The clutch-controlled transfer case having a two-stage intermediate gearing permits all advantages of the described device for actuating a clutch-controlled transfer case having a two-stage intermediate gearing to be exploitable in combination with such a transfer case.

Both the device as well as the transfer case can have, alternatively or additionally, individual features or a combination of multiple features, which were described at the outset in conjunction with the prior art and/or which were described in one or multiple documents mentioned with respect to the prior art.

In addition, the device can have, alternatively or additionally, individual features or a combination of multiple features, which were previously described in conjunction with the transfer case; likewise, the transfer case can have, alternatively or additionally, individual features or a combination of multiple features, which were previously described in conjunction with the device.

It is important to emphasize that, due to the previously described measures, a method for detecting the selector position can be implemented, in order to avoid an undesirable rotation of the selector shaft in the second angle-of-rotation range, which forms the shift range of the intermediate gearing.

DESCRIPTION OF THE DRAWINGS

The invention and its advantages are explained in greater detail in the following with reference to exemplary embodiments depicted in the figures. The ratios of the sizes of the individual elements with respect to one another in the figures do not always correspond to the real ratios of sizes, since some shapes in the figures have been simplified and other shapes have been enlarged in relation to other elements, for the sake of better illustration. Identical reference numbers are used for identical or identically acting elements of the invention. Furthermore, for the sake of clarity, only those reference numbers are shown in the individual figures that are necessary for describing the particular figure. The depicted embodiments are merely examples of how the transfer case according to the invention can be designed and are not a final limitation. In a schematic representation.

DETAILED DESCRIPTION

Figure 1:
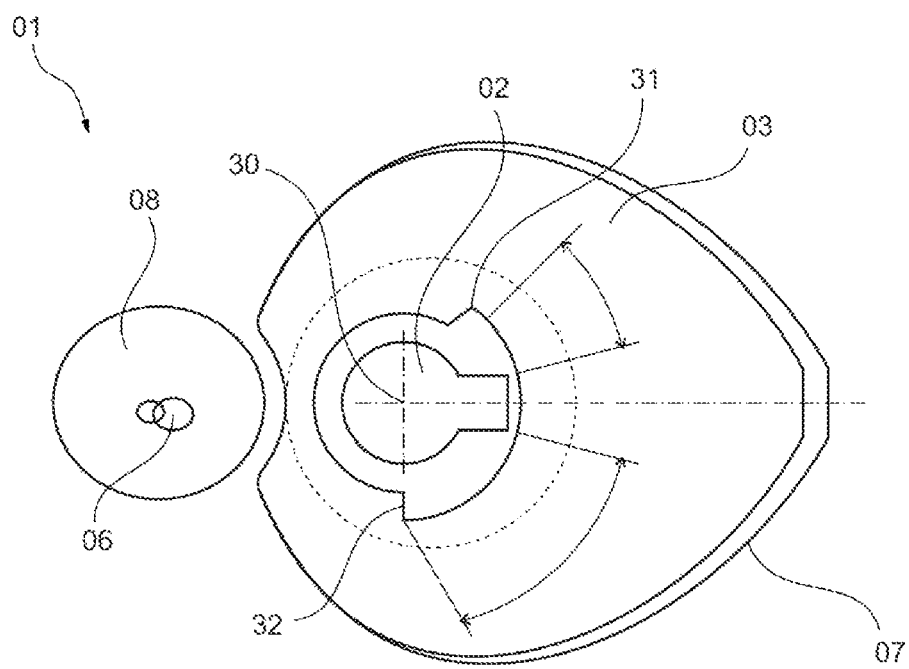
FIG. 1 shows a detailed view of an arrangement of a clutch cam disk, which is rotatable through an angle-of-rotation range, on a selector shaft of a device for actuating a clutch-controlled transfer case having a two-stage intermediate gearing, as viewed along the clutch cam disk axis.
Figure 2:
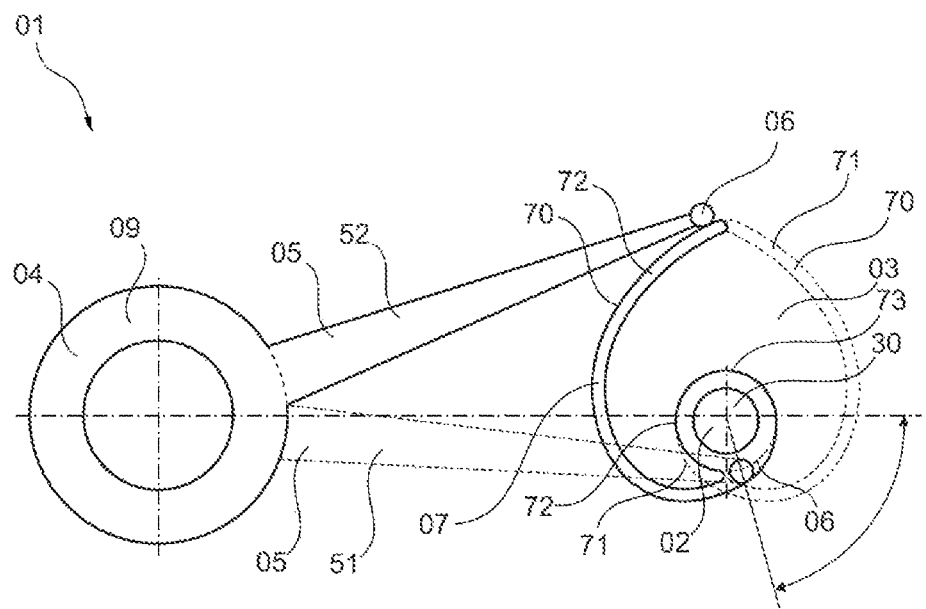
FIG. 2 shows a device for actuating a clutch-controlled transfer case having a two-stage intermediate gearing, in a view along the clutch cam disk axis.

A device 01 for actuating a clutch-controlled transfer case having a two-stage intermediate gearing, which is depicted in FIG. 1 and in FIG. 2 as a whole or in parts, comprises:

a selector shaft 02, which is driven so as to be rotatable in opposite directions of rotation, a drive, preferably an electric motor, wherein other drives, such as, e.g., hydraulic or pneumatic drives, to name only a few conceivable embodiments, or combinations thereof, are conceivable for rotating the selector shaft 02, a clutch cam disk 03 and, optionally, a selector cam disk, both of which can be rotated by means of the selector shaft 02 about a separate axis or about a shared axis which is identical, e.g., to the axis of the selector shaft 02, or one of which can be rotated about the axis of the selector shaft 02 and the other can be rotated about a separate axis, and one or two scissor levers 05, which are coupled to an actuating mechanism 04 for actuating a friction clutch which establishes, as necessary, a variable power flow between the drive shaft of the transfer case and the secondary shaft of the transfer case, wherein:

one end 06 of at least one scissor lever 05 is guided on or in a gate 07 provided on the clutch cam disk 03, the gate 07 has a curved path 71, 72 for each scissor lever 05, in which curved path the end 06 of the scissor lever 05 associated with the curved path 71, 72 is guided, the at least one curved path 71, 72 winds around a clutch cam disk axis 30, which is normal to the end face of the clutch cam disk 03, by at least 360° (FIG. 2), the at least one curved path 71, 72 has at least one helical segment 70 having a distance from the clutch cam disk axis 30 which continuously increases or decreases with a change in the angle of rotation, along which segment 70 one end 06 of a scissor lever 05 guided therein experiences a continuously increasing or decreasing change in deflection, preferably normal to the clutch cam disk axis 30, during a rotation of the clutch cam disk 03 with increasing angle of rotation (FIG. 2), and the clutch cam disk 03 is disposed in such a way that the clutch cam disk can be rotated around the clutch cam disk axis 30 with respect to the selector shaft 02 between two stops 31, 32 by an angle-of-rotation range 2 (FIG. 3), which forms a neutral range (FIG. 1), such that, by means of rotation of the selector shaft 02 within the angle-of-rotation range 2 situated between said stops 31, 32, shifting back and forth between the first and the second shifting stage of the intermediate gearing occurs, and, by means of rotation of the selector shaft beyond the angle-of-rotation range 2, the end 06 of the at least one scissor lever 05 experiences a deflection for actuating the clutch while a selected shifting stage is maintained.

Clutch cam disk axis 30 primarily refers to a geometric feature in this case and not necessarily to a mechanical element in the sense of a shaft. Preferably, the clutch cam disk 03 is disposed within the angle-of-rotation range 2 so as to be rotatable with respect to the selector shaft 02 about the clutch cam disk axis 30.

As depicted in FIG. 1, the clutch cam disk 03 can be disposed on the selector shaft 02 so as to be rotatable through the angle-of-rotation range 2 forming the neutral range.

Figure 3:
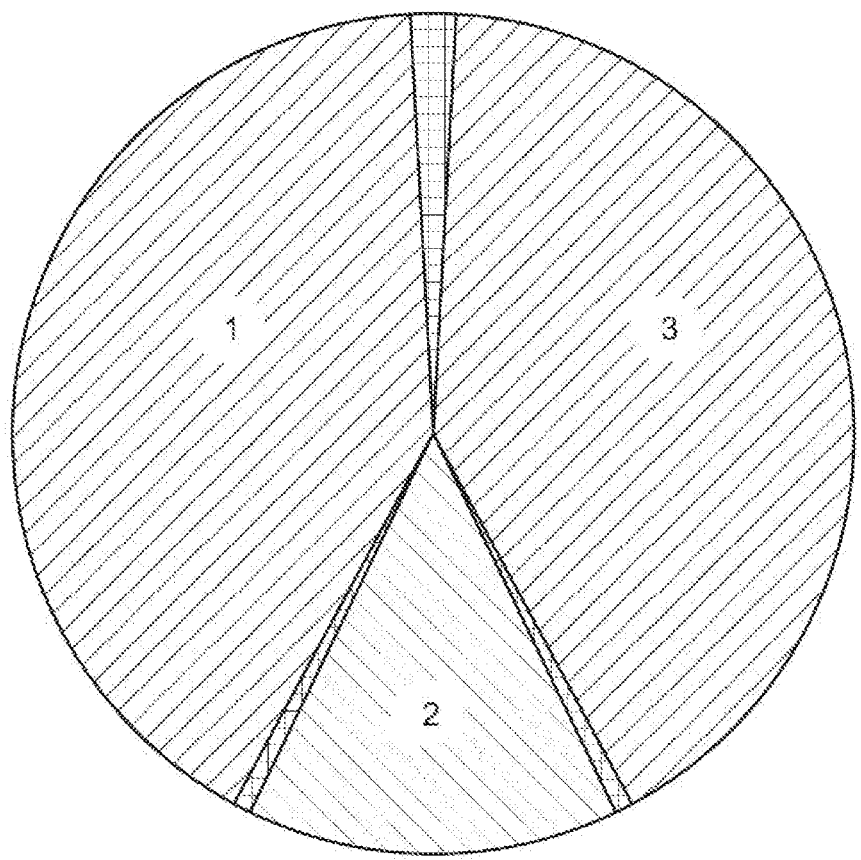
FIG. 3 shows a diagram depicting the functions of a device for actuating a clutch-controlled transfer case having a two-stage intermediate gearing with respect to angle-of-rotation ranges of its selector shaft.

As depicted in FIG. 3, by means of the device 01, in a first angle-of-rotation range 1, the clutch is actuated in the first shifting stage of the intermediate gearing; in a second angle-of-rotation range 2, shifting back and forth between the first and the second shifting stage occurs; and, in a third angle-of-rotation range 3, the clutch is actuated in the second shifting stage of the intermediate gearing.

In order to permit shifting back and forth between the first and the second shifting stage of the intermediate gearing within the second angle-of-rotation range 2 forming the neutral range, the selector shaft 02 or a selector cam disk non-rotatably connected to the selector shaft 02 is operatively connected to the intermediate gearing in such a way that switching between the shifting stages of the intermediate gearing occurs when the selector shaft 02 is rotated, starting from the neutral position, in opposite directions of rotation within the second angle-of-rotation range 2, wherein, once the neutral range has been exited by way of the second angle-of-rotation range 2 being exceeded, the shifting stage of the intermediate gearing, which has been selected by means of a direction of rotation starting from the neutral position, is maintained, and the friction clutch is pressed together with increasing force as the angle of rotation increases due to a resultant entraining of the clutch cam disk 03 as the rotation of the selector shaft 02 continues at the end or outside of the second angle-of-rotation range 2 due to a deflection of the at least one scissor lever 05, the friction coupling establishing a variable power flow between the drive shaft of the transfer case and the secondary shaft of the transfer case.

While shifting back and forth between the first and the second shifting stage of the intermediate gearing occurs within the second angle-of-rotation range 2 forming the neutral range, the clutch cam disk 03 is held still in a neutral position by the at least one scissor lever 05 guided via its end 06 in the gate 07 (FIG. 1).

Once the selector shaft 02 has been rotated past the second angle-of-rotation range 2, the clutch cam disk begins to rotate as well, via a stop 31, 32. Therefore, an angle-of-rotation range of at least approximately 180°, preferably of up to or even greater than 360°, is available, in each of the two directions of rotation, only for the actuation of the friction clutch.

As a result, an angular deflection of more than 360° can be achieved, accompanied by a transmission ratio which is increased by at least approximately 25% as compared to a limited angular deflection of less than 360°.

The at least one scissor lever 05 can be provided, at its end 06 guided in the gate 07, with at least one roller 08 which is rotatably supported at the end 06 and rolls on or in the gate 07 (FIG. 1).

Figure 4:
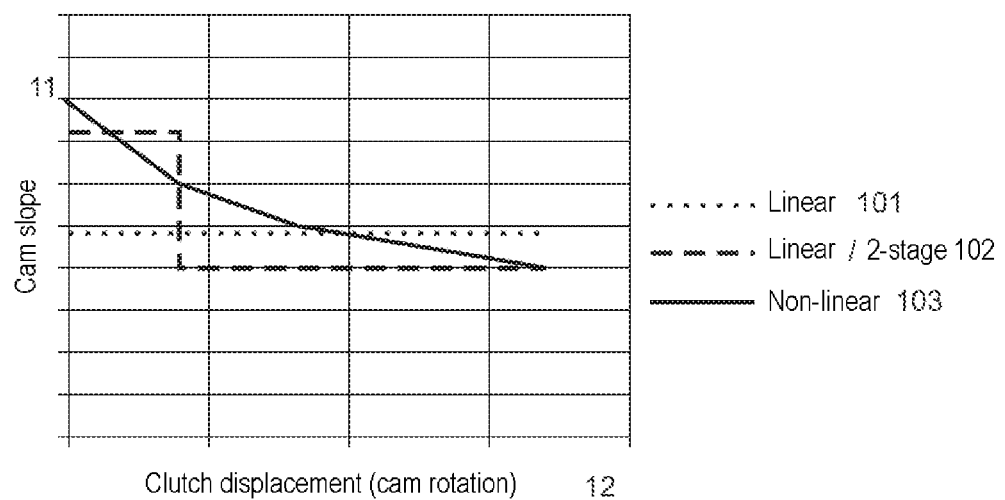
FIG. 4 shows a diagram comparing two degressive configurations of a linear embodiment of a curved path of a gate provided on a clutch cam disk of a device for actuating a clutch-controlled transfer case having a two-stage intermediate gearing.

The at least one curved path 71, 72 of the gate 07 provided on the clutch cam disk 03 can have a degressive configuration with regard to she deflection of the at least one scissor lever 05, which is guided via its end 06 in the curved path, which deflection increases as the angle of rotation increases at least in one direction of rotation, preferably both in one direction of rotation and in the other, opposite direction of rotation, as depicted in FIG. 4. In FIG. 4, 11 "cam slope" indicates the extent of the change in deflection with respect to the extent of the change in the angle of rotation, which is labeled 12 "clutch displacement (cam rotation)". FIG. 4 shows three different progressions: 101 "Linear" indicates a linear embodiment having a linear relationship of deflection and angle of rotation, 102 "Linear/2-stage" indicates a degressive configuration having a linear relationship of deflection and angle of rotation, which is subdivided into two sections, the two sections having different proportionality, and 103 "Non-linear" indicates a degressive configuration having a continuously changing proportionality of the relationship of deflection and angle of rotation.

Therefore, the degressive configuration of the at least one curved path 71, 72 of the gate 07, which effectuates changes in the deflection of the scissor lever 05 by different extents given a constant change in the angle of rotation, can be designed either on the basis of a mathematical function (103) which is constant in the mathematical sense, or so as to have two or more slopes (102) which are different, but each of which is constant.

Figure 5:
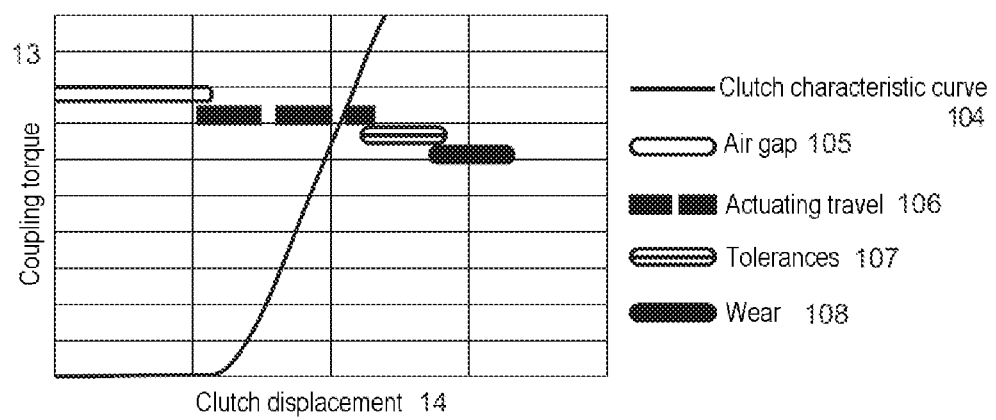
FIG. 5 shows the progression of the actuating force of a friction clutch as compared to its clutch travel.

The background of the degressive configuration is that the clutch travel, through which the friction clutch must be pressed together in order to be actuated, and which is referred to as 14 "clutch displacement" in FIG. 5 and is passed through when the clutch is pressed together, is essentially divided into the three sections 105, 107 and 108, and 106: section 105: air gap, section 107 and 108: tolerances and wear, and section 106: actuating or displacement travel. The necessary forces are very low in the air gap. Therefore, this area can be passed through with a high slope, accompanied by a low transmission ratio of the at least one curved path 71, 72 of the gate 07. Due to the high slope, only a small angle of rotation of the selector shaft 02 is required for a specified air gap of the friction clutch, whereby a greater part of the first angle-of-rotation range 1 and of the third angle-of-rotation range 3, which is available for pressing the friction clutch together and within which the friction clutch is actuated, remains. In this remaining part, the at least one curved path 71, 72 of the gate has a low slope, corresponding to a high transmission ratio.

The degressive configuration is preferably designed, in this case, in such a way that the curved path, along its progression about the clutch cam disk axis 30, has different slopes away from and/or toward the clutch cam disk axis 30 in the area of an air gap of the friction clutch and in the area of a clutch actuation, in which the friction clutch is pressed together at the end of the air gap.

FIG. 5 shows, for this purpose, the progression—indicated by 104 "clutch characteristic curve"—of the force—indicated by 13 "coupling torque"—required for pressing the friction clutch together across the clutch travel—indicated by 14 "clutch displacement"—which is passed through when the clutch is pressed together.

It is apparent that different forces must be applied along the different sections of the progression 104, which are referred to as 105 "air gap", 106 "displacement travel", 107 "tolerances", and 108 "wear". For example, hardly any force is required for passing through the section 105, but the force required for passing through the subsequent sections 106, 107 and 108 increases greatly.

The degressive configuration makes it possible to adapt the transmission ratio, which can be influenced by the extent of the change in the deflection via the change in the angle of rotation, to these circumstances.

For example, starting from the neutral position depicted in FIG. 1, a high slope can be initially provided in section 105 of the air gap, whereas, adjacent thereto, a flat slope can be provided in section 106 of the clutch actuation.

As a result, the transmission ratio in section 106 of the clutch actuation can be increased by approximately 20% as compared to a linear design.

The actuating mechanism 04, which is coupled to the scissor lever or scissor levers 05 and is provided for actuating the friction clutch of a clutch-controlled transfer case having a two-stage intermediate gearing, can comprise two ramp rings 09, which can be rotated with respect to one another and which can either both be rotated with respect to one another, or one is designed so as to be stationary and the other is designed so as to be rotatable with respect to the stationary ramp ring. At least one ramp ring 09 is connected to one scissor lever 05 or is integral therewith. It is essential that a rotation of the two ramp rings 09 in the opposite direction pushes the ramp rings apart in the axial direction.

This can be implemented by means of a stationary first ramp ring 09 and a second ramp ring 09, which is connected to one scissor lever 05 or is integral therewith, wherein the second ramp ring 09 can be rotated, starting from a neutral position, in both directions with respect to the first ramp ring 09, and a rotation of the second ramp ring 09 both in a first direction of rotation and in an opposite, second direction of rotation pushes the two ramp rings apart 09 in the axial direction.

Alternatively, two scissor levers 05 can be provided, as is depicted in FIG. 2.

In this case, a curved path 71, 72 of the gate 07 is associated with the end 06 of each scissor lever 05. In each direction of rotation of the clutch cam disk, a curved path 71, 72 winds, starting from a neutral position situated, e.g., in approximately the middle of the curved path 71, 72, around the clutch cam disk axis 30 by at least 180°, preferably by up to or even more than 360°, and therefore more than one full revolution of the clutch cam disk 03 is required for one end 06 of a scissor lever 05, which is guided in a curved path 71, 72, to move from the beginning of a curved path 71, 72, e.g., via the neutral position, to the end of the curved path 71, 72.

In order to obtain a movement in the opposite direction, which is required for actuating an actuating mechanism 04, which comprises, e.g., two ramp rings 09
  the ramp rings 09 of said actuating mechanism each being connected to or integral with a scissor lever 05
  the ends 06 of the two scissor levers 05 can each be guided in a separate curved path 71, 72, diametrically opposite one another with respect to the clutch cam disk axis 30, as is depicted in FIG. 2.

The curved paths 71, 72 for the ends 06 of the two scissor levers 05 can be provided on opposite end faces of the clutch cam disk 03. Preferably, the clutch cam disk axis 30 is normal to the opposite end faces.

The curved paths 71, 72 can be designed so as to have point symmetry with respect to the clutch cam disk axis 30 and, therefore, can be provided on the same end face of the clutch cam disk 03, but swiveled apart by 180° with respect to one another.

In this case, a first curved path 71 associated with a first scissor lever 51 and a second curved path 72 associated with a second scissor lever 52 can be provided on the same end face of the clutch cam disk 03, wherein the curved paths 71, 72 are designed so as to be nested into each other, spiraling around the clutch cam disk axis 30, which is normal to the end face of the clutch cam disk 03.

In principle, a point-symmetrical embodiment of the curved paths 71, 72 is also possible in the case of an arrangement on opposite end faces of the clutch cam disk 03.

The curved paths 71, 72 can be designed to be provided on the clutch cam disk 03 in such a way that, starting from a neutral position of the clutch cam disk 03, in which both scissor levers 05 assume a starting position, upon rotation in a first direction of rotation, a first scissor lever 51 experiences an increasing deflection away from the clutch cam disk axis 30 or toward the clutch cam disk axis 30 as the angle of rotation increases, whereas a second scissor lever 52 maintains its starting position and, upon rotation in a second direction, which is opposite the first direction of rotation, the second scissor lever 52 experiences an increasing deflection away from the clutch cam disk axis 30 or toward the clutch cam disk axis 30 as the angle of rotation increases, whereas the first scissor lever 51 maintains its starting position. FIG. 2 shows an embodiment in which, starting from a neutral position, upon rotation of the clutch cam disk 03 in a first direction of rotation, the first scissor lever 51 experiences an increasing deflection away from the clutch cam disk axis 30 as the angle of rotation increases, whereas a second scissor lever 52 maintains its starting position and, likewise starting from a neutral position, upon rotation in a second direction, which is opposite the first direction of rotation, the second scissor lever 52 experiences an increasing deflection away from the clutch cam disk axis 30 as the angle of rotation increases, whereas the first scissor lever 51 maintains its starting position.

This can be implemented, e.g., by means of two curved paths 71, 72 having a first helical section 70 for the increasing or decreasing deflection away from or toward the clutch cam disk axis 30, which section transitions into a second section 73, which encircles the clutch cam disk axis 30 at a fixed distance, in a manner similar to that of an endless groove.

Alternatively, the at least one curved path 71, 72 can be designed in such a way that, starting from a neutral position, when the clutch cam disk 03 is rotated in a first direction of rotation, a scissor lever 05 guided via its end 06 in the curved path 71, 72 experiences an increasing deflection away from the clutch cam disk axis 30 as the angle of rotation increases and, in a second direction of rotation opposite the first direction of rotation, experiences a decreasing deflection toward the clutch cam disk axis 30.

In summary, therefore, the at least one curved path 71, 72 can be designed in such a way that, starting from a neutral position, upon rotation of the clutch cam disk 03 in a first direction of rotation and/or in a second direction of rotation opposite the first direction of rotation, a scissor lever 05, 51 guided via its end 06 in the curved path 71, 72 experiences an increasing deflection away from the clutch cam disk axis 30 or a decreasing deflection toward the clutch cam disk axis 30 as the angle of rotation increases, but an optionally provided, remaining scissor lever 05, 52 experiences no deflection or a deflection with respect to the clutch cam disk axis 30 as the angle of rotation increases in the same direction of rotation, which deflection results in an opposite movement of the remaining scissor lever 05, 52, e.g., by way of the end 06 of the remaining scissor lever 05, 52 being disposed diametrically opposite the end 06 of the other scissor lever 05, 51 with respect to the clutch cam disk axis 30 and being guided in a curved path 72, which is disposed with point symmetry with respect to the curved path 71 associated with the end 06 of the other scissor lever 05, 51.

It is important to emphasize that, when two scissor levers 05, 51, 52 are provided, each of which is guided via their ends 06 in a curved path 71, 72 of the gate 07, the two curved paths 71, 72 each associated with one end 06 of a scissor lever 05 can be designed in such a way that the scissor levers 05 swivel in opposite directions in both directions of rotation.

As mentioned above, this can be implemented, e.g., by means of a guidance of the ends of the scissor levers 05, 51, 52 in or on the gate 07, which is diametrically opposed with respect to the clutch cam disk axis 30.

In principle, an embodiment having only one scissor lever, which is guided via its end provided, e.g., with a roller, in a gate of the clutch cam disk, is conceivable, or an embodiment having a first scissor lever, which is guided via its end provided, e.g., with a roller, in a gate of the clutch cam disk, and having a second, second scissor lever which is supported, e.g., against a housing or against the selector shaft, is conceivable.

Figure 6:
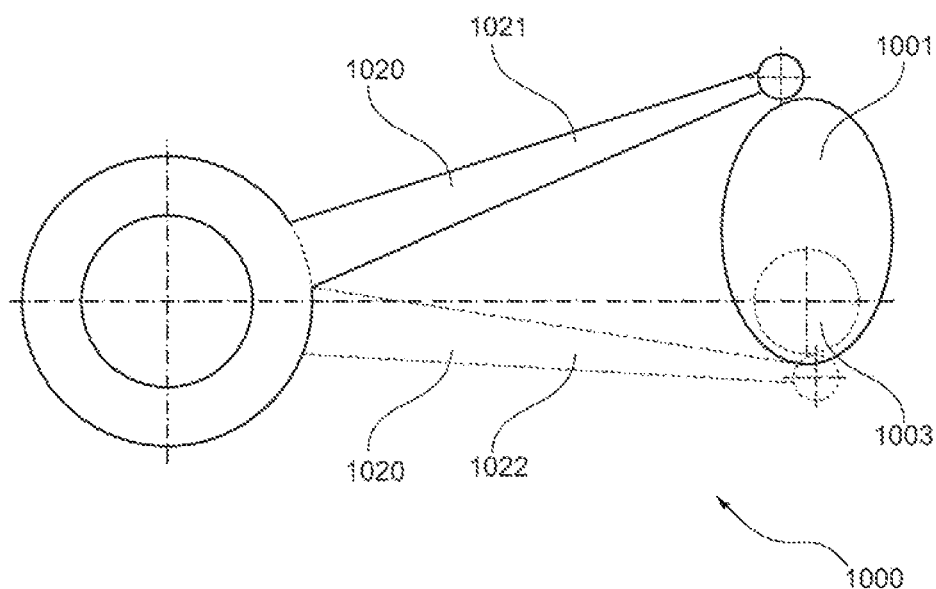
FIG. 6 shows a device for actuating a clutch-controlled transfer case having a two-stage intermediate gearing.

It is important to emphasize that, in a device 1000 depicted in FIG. 6 for actuating a clutch-controlled transfer case having a two-stage intermediate gearing by means of the clutch cam disk, which is also referred to as a control cam 1001, two scissor levers 1020 are swivelled in opposition to one another and then exert an axial force on the clutch, e.g., via helical ball ramp mechanisms. One of the two scissor levers 1021 can move via its end, e.g., on the circumference of the control cam 1001, whereas the other scissor lever 1022 is supported against the selector shaft 1003 or against a housing of a clutch-controlled transfer case having a two-stage intermediate gearing, which, inter alia, can accommodate, e.g., at least one part of the device for actuating the clutch-controlled transfer case having a two-stage intermediate gearing.

In the device 01, however, a gate 07 provided on the clutch cam disk 03 for guiding one end 06 of at least one scissor lever 05 is provided with a separate helical curved path 71, 72 for each guiding end 06 of a scissor lever 05, at least for the end 06 of a scissor lever 05 provided, e.g., with at least one roller 08, and preferably for the ends 06 of both scissor levers 51, 52, each of which is provided, e.g., with at least one roller 08. As a result, in the device 01 according to the invention, an angle-of-rotation range of the clutch cam disk 03 which can exceed 360° is obtained, whereby, as compared to a rotation through less than 360°, a smaller slope of one curved path or both curved paths 71, 72, as viewed in the radial direction of the clutch cam disk axis 30, with respect to a specified increment of the angle of rotation is selected and, as a result, a higher transmission ratio can be implemented.

The device 01 is advantageously usable in combination with a clutch-controlled transfer case having a two-stage intermediate gearing, which comprises:
a drive shaft,
a primary shaft, which is permanently coupled to the drive shaft, e.g., being fixedly connected thereto or integral therewith,
a secondary shaft, which is optionally disposed with axial offset with respect to the drive shaft,
optionally, a transfer case, which is disposed between the secondary shaft and the drive shaft and bridges their axial offset, which offset may be present,
a friction clutch, which is disposed between the drive shaft and the secondary shaft, couples these to the drive shaft as necessary for its operation and decouples these from the drive shaft as necessary for its disengagement, the friction clutch having at least one friction pair consisting of a first friction disk, which is non-rotatably connected to a driven shaft, and a second friction disk, which is non-rotatably connected to a shaft to be driven,
an actuating mechanism 04 which, when actuated, exerts an axial force on the one friction pair or the multiple friction pairs of the friction clutch, which axial force causes the friction clutch to be pressed together, and
a two-stage intermediate gearing having a first and a second shifting stage.

The transfer case is distinguished by an above-described device 01 for actuating a clutch-controlled transfer case having a two-stage intermediate gearing, which actuates the friction clutch and switches the shifting stages of the intermediate gearing. The actuating mechanism 04, in order to be actuated, is coupled to the at least one scissor lever 05, which is guided via its end 06 in the gate 07 of the clutch cam disk 03, and/or is operatively connected thereto.

The primary shaft, which is permanently coupled to the drive shaft, is either fixedly connected to the drive shaft or is integral therewith.

The secondary shaft can be disposed with axial offset with respect to the drive shaft. In this case, a transfer case, which bridges the axial offset, is disposed between the secondary shaft and the drive shaft.

It is apparent that the invention can be implemented, as a whole and/or in part, by means of the following measures, which can be combined in any way, in principle, in order to increase the transmission ratio of a clutch cam disk 03, which has very good efficiency, in principle:

A clutch cam disk 03, which can be rotated through the selector angle, for actuating the clutch. The clutch cam disk 03 is supported on the selector shaft 02 so as to be rotatable through an angle-of-rotation range 2, which is also referred to as a clearance angle. When the selector shaft 02 is rotated within the angle-of-rotation range 2, shifting back and forth between the shifting stages of the intermediate gearing occurs. If the angle-of-rotation range 2 is exceeded both in one direction of rotation and in the opposite direction of rotation, the clutch cam disk 03 is entrained by the selector shaft 02 via one of the two stops 31, 32. As a result, an angle-of-rotation range 1 and/or an angle-of-rotation range 3 of the cam disk of 360° remains exclusively for the clutch actuation, whereby the transmission ratio of the clutch cam disk 03 can be increased by approximately 25%.

Degressive geometry of the clutch cam disk 03. Due to a different slope of the clutch cam disk 03, having a high slope in the range of the air gap and a flat slope in the range of the clutch actuation, the transmission ratio can be increased by another 20%.

Increased swivel angle: Due to a helical arrangement of the at least one curved path 71, 72 of the gate 07 provided on the clutch cam disk 03, accompanied by separate curved paths 71, 72 for the two scissor levers 05, 51, 52, an angle of rotation of the clutch cam disk 03 of more than 360° can be obtained.

It is important to mention that, in order to determine the present angle-of-rotation position of the clutch cam disk 03, a sensor can be advantageously provided, e.g., an angle-of-rotation sensor and/or, e.g., in the case of another sensor, which is designed as a summing angle-of-rotation sensor, e.g., a sensor which senses a marking or the like, e.g., on the outer circumference of the clutch cam disk 03 or on the selector shaft 02, such as, for example, an optical sensor, a sensor logic can be provided, the function of which allows for an unambiguous detection of an angle-of-rotation range exceeding 360°, in order to meet safety goals, for example. The background is that a position sensor, which can measure only in an angle-of-rotation range between 0° and 360°, cannot deliver an unambiguous signal in an overlap region, which occurs as a result of an angle-of-rotation range exceeding 360°.

The invention is industrially applicable, in particular, in the field of manufacturing clutch-controlled transfer cases 01 having a two-stage intermediate gearing.

The invention was described with reference to one preferred embodiment. It is conceivable to a person skilled in the art, however, that modifications of or changes to the invention can be made without departing from the scope of protection of the claims which follow.

The invention claimed is:

1. A device for actuating a clutch-controlled transfer case, comprising:
    a rotatably driven selector shaft for being driven by a drive,
    a clutch cam disk rotatable about a clutch cam disk axis by means of the selector shaft and having a gate along an outer perimeter thereof, and
    at least one scissor lever having an end guided in the gate of the clutch cam disk,
    the gate having at least one curved path having a continuously increasing radial distance from the clutch cam disk axis, along which the end of the at least one scissor lever guided therein experiences a continuously increasing or decreasing change in deflection with respect to the clutch cam disk axis during a rotation of the clutch cam disk with increasing angle of rotation, and
    the clutch cam disk defining an opening about the clutch cam disc axis, and the clutch cam disk defining a pair of stops extending radially into the opening,
    the selector shaft rotatably positioned in the opening about and along the clutch cam disk axis, the selector shaft being partially in radial alignment with the pair of stops such that the selector shaft can be rotated with respect to the clutch cam disk between the pair of stops by an angle-of-rotation range such that, by means of rotation of the selector shaft within the angle-of-rotation range situated between the pair of stops, shifting back and forth between shifting stages of the transfer case occurs, and, by means of rotation of the selector shaft beyond the angle-of-rotation range, the end of the at least one scissor lever experiences a deflection for actuating the clutch while a selected shifting stage is maintained.

2. The device as claimed in claim 1, wherein the at least one scissor lever is provided, at the end guided in the gate, with at least one rotatably supported roller, which rolls in the gate.

3. The device as claimed in claim 1, wherein the at least one curved path has a degressive configuration with regard to the deflection of the at least one scissor lever, which is guided via the end in the gate, which deflection increases as the angle of rotation increases.

4. The device as claimed in claim 3, wherein the degressive configuration is designed in such a way that the curved path, along its progression about the clutch cam disk axis, has different slopes away from and toward the clutch cam disk axis.

5. The device as claimed in claim 4, wherein the curved path includes a portion having a high slope and a portion with a flat slope adjacent to the portion having a high slope.

6. The device as claimed in claim 3, wherein the degressive configuration of the at least one curved path has two or more slopes which are different, but each of which is constant.

7. The device as claimed in claim 1, wherein the clutch cam disk is disposed on the selector shaft so as to be rotatable through the angle-of-rotation range.

8. The device as claimed in claim 1, wherein the at least one scissor lever includes two scissor levers.

9. The device as claimed in claim 8, wherein the ends of the two scissor levers are each guided in a separate curved path diametrically opposite one another with respect to the clutch cam disk axis.

10. The device as claimed in claim 9, wherein the for the two scissor levers are provided on opposite end faces of the clutch cam disk.

11. The device as claimed in claim 9, wherein the curved paths are designed with point symmetry with respect to the clutch cam disk axis.

12. The device as claimed in claim 9, wherein the curved paths are designed in such a way that, starting from a neutral position of the clutch cam disk, in which both scissor levers assume a starting position, upon rotation in a first direction of rotation, the first scissor lever experiences an increasing deflection away from the clutch cam disk axis or toward the clutch cam disk axis as the angle of rotation increases, whereas the second scissor lever maintains its starting position and, upon rotation in a second direction of rotation, which is opposite the first direction of rotation, the second scissor lever experiences an increasing deflection away from the clutch cam disk axis or toward the clutch cam disk axis as the angle of rotation increases, whereas the first scissor lever maintains its starting position.

13. The device as claimed in claim 1, wherein the at least one curved path is designed in such a way that, starting from a neutral position, when the clutch cam disk is rotated in a first direction of rotation, the scissor lever guided via the end in the curved path experiences an increasing deflection away from the clutch cam disk axis as the angle of rotation increases and, in a second direction of rotation opposite the first direction of rotation, experiences a decreasing deflection toward the clutch cam disk axis.

14. A clutch-controlled transfer case actuating device, comprising:
    a rotatably driven selector shaft for being driven by a drive,
    a clutch cam disk rotatable about a clutch cam disk axis by means of the selector shaft and having a gate along an outer perimeter thereof,
    at least one scissor lever having an end guided in the gate of the clutch cam disk,
    the gate having at least one curved path having a continuously increasing radial distance from the clutch cam disk axis, along which the end of the at least one scissor lever guided therein experiences a continuously increasing or decreasing change in deflection with respect to the clutch cam disk axis during a rotation of the clutch cam disk with increasing angle of rotation, and
    the clutch cam disk defining an opening about the clutch cam disc axis, and the clutch cam disk defining a pair of stops extending radially into the opening,
    the selector shaft rotatably positioned in the opening about and along the clutch cam disk axis, the selector shaft partially in radial alignment with the pair of stops such that the selector shaft can be rotated relative to the clutch cam disk about the clutch cam disk axis between the pair of stops by an angle-of-rotation range for providing shifting back and forth between shifting stages of the transfer case, and, by means of rotation of the selector shaft beyond the angle-of-rotation range, the end of the at least one scissor lever experiences a deflection for actuating the clutch while a selected one of the shifting stages is maintained.

\* \* \* \* \*